United States Patent
Supino et al.

(10) Patent No.: US 7,971,483 B2
(45) Date of Patent: Jul. 5, 2011

(54) SYSTEMS AND METHODS FOR ACCELERATION AND ROTATIONAL DETERMINATION FROM AN OUT-OF-PLANE MEMS DEVICE

(75) Inventors: Ryan Supino, Loretto, MN (US); Burgess Johnson, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 526 days.

(21) Appl. No.: 12/057,695

(22) Filed: Mar. 28, 2008

(65) Prior Publication Data
US 2009/0241662 A1   Oct. 1, 2009

(51) Int. Cl.
*G01P 9/04* (2006.01)
*G01C 19/56* (2006.01)
(52) U.S. Cl. .................. 73/504.04; 73/504.12
(58) Field of Classification Search .......... 73/504.04, 73/504.12, 504.14, 514.32, 510, 511, 504.03; 702/141
See application file for complete search history.

(56) References Cited

U.S. PATENT DOCUMENTS

| | | | |
|---|---|---|---|
| 5,025,346 A | 6/1991 | Tang et al. | |
| 5,659,195 A | 8/1997 | Kaiser et al. | |
| 5,698,783 A * | 12/1997 | Murakoshi et al. | 73/504.03 |
| 6,349,597 B1 | 2/2002 | Folkmer | |
| 6,701,786 B2 * | 3/2004 | Hulsing, II | 73/514.02 |
| 6,817,244 B2 | 11/2004 | Platt | |
| 6,892,575 B2 | 5/2005 | Nasiri et al. | |
| 6,928,872 B2 | 8/2005 | Durante | |
| 6,939,473 B2 | 9/2005 | Nasiri et al. | |
| 7,036,372 B2 | 5/2006 | Chojnacki et al. | |
| 7,036,373 B2 | 5/2006 | Johnson et al. | |
| 7,051,590 B1 | 5/2006 | Lemkin et al. | |
| 7,146,856 B2 * | 12/2006 | Malametz | 73/514.32 |
| 7,238,999 B2 | 7/2007 | LaFond et al. | |
| 7,250,112 B2 | 7/2007 | Nasiri et al. | |
| 7,444,869 B2 * | 11/2008 | Johnson et al. | 73/504.12 |
| 7,640,803 B1 * | 1/2010 | Gutierrez et al. | 73/504.04 |
| 7,703,324 B2 | 4/2010 | Sutton et al. | |
| 2004/0035206 A1 | 2/2004 | Ward et al. | |
| 2004/0129076 A1 | 7/2004 | Platt | |
| 2004/0154397 A1 | 8/2004 | Platt et al. | |
| 2005/0081633 A1 | 4/2005 | Nasiri et al. | |
| 2005/0082252 A1 | 4/2005 | Nasiri et al. | |
| 2006/0163679 A1 | 7/2006 | LaFond et al. | |
| 2006/0219006 A1 | 10/2006 | Nasiri et al. | |
| 2007/0012653 A1 | 1/2007 | Nasiri et al. | |
| 2008/0276706 A1 | 11/2008 | Hartmann | |
| 2009/0255336 A1 * | 10/2009 | Horning et al. | 73/504.12 |

* cited by examiner

*Primary Examiner* — Helen C. Kwok
(74) *Attorney, Agent, or Firm* — Fogg & Powers LLC

(57) ABSTRACT

A Micro-Electro-Mechanical Systems (MEMS) inertial sensor systems and methods are operable to determine linear acceleration and rotation. An exemplary embodiment applies a first linear acceleration rebalancing force via a first electrode pair to a first proof mass, applies a second linear acceleration rebalancing force via a second electrode pair to a second proof mass, applies a first Coriolis rebalancing force via a third electrode pair to the first proof mass, applies a second Coriolis rebalancing force via a fourth electrode pair to the second proof mass, determines a linear acceleration corresponding to the applied first and second linear acceleration rebalancing forces, and determines a rotation corresponding to the applied first and second Coriolis rebalancing forces.

19 Claims, 9 Drawing Sheets

SYSTEMS AND METHODS FOR ACCELERATION AND ROTATIONAL DETERMINATION FROM AN OUT-OF-PLANE MEMS DEVICE

BACKGROUND OF THE INVENTION

Micro-Electro-Mechanical Systems (MEMS) inertial measurement units contain three gyroscopes and three accelerometers for detecting changes in attitude and acceleration. Typically, the three gyroscopes and the three accelerometers are mounted on separate orthogonal axis, each with their own set of control and read-out electronics. It is appreciated that there is an inherent cost in the assembly of the MEMS inertial measurement unit in view that the three gyroscopes and the three accelerometers must be precisely installed, in view that a relatively large amount of processing capacity is required to process information form six separate units, and in view of the power source requirements to power the three gyroscopes and the three accelerometers. Many applications require a reduction in size, computational requirements, power requirements, and cost of a MEMS inertial measurement unit. In view of these constraints, it would be advantageous to reduce the number of sensing devices in a MEMS inertial measurement unit.

A conventional MEMS gyroscope may be used to determine angular rotation by measuring Coriolis forces exerted on resonating proof masses. A conventional MEMS gyroscope includes two silicon proof masses mechanically coupled to and suspended from a substrate, typically glass, using one or more silicon flexures. A number of recesses etched into the substrate allow selective portions of the silicon structure to move back and forth freely within an interior portion of the device. In certain designs, substrates can be provided above and below the silicon structure to sandwich the proof masses between the two substrates. A pattern of metal traces formed on the substrate(s) can be used to deliver various electrical bias voltages and signal outputs to the device.

A drive system for many MEMS gyroscopes typically includes a number of drive elements that cause the proof mass to oscillate back and forth along a drive axis perpendicular to the direction in which Coriolis forces are sensed. In certain designs, for example, the drive elements may include a number of interdigitated vertical comb fingers configured to convert electrical energy into mechanical energy using electrostatic actuation. Such drive elements are described, for example, in U.S. Pat. No. 5,025,346 to Tang et al., entitled "LATERALLY DRIVEN RESONANT MICROSTRUCTURES," and U.S. Pat. No. 7,036,373 to Johnson et al., entitled "MEMS GYROSCOPE WITH HORIZONTALLY ORIENTED DRIVE ELECTRODES," both of which are incorporated herein by reference in their entirety.

Other types of MEMS devices may be used to measure both linear acceleration and rotation. However, such MEMS devices are operated in an open loop mode wherein the acceleration and rotation (gyro) responses are coupled with and depend on each other. Accordingly, systems that independently measure both linear acceleration and rotational movement require at least two different devices so that the acceleration sensing is decoupled from the rotation sensing, which may result in increased complexity and costs.

SUMMARY OF THE INVENTION

Systems and methods of determining linear acceleration and rotation using a Micro-Electro-Mechanical Systems (MEMS) inertial sensor are disclosed. An exemplary embodiment has a first proof mass; a second proof mass; a first electrode pair operable to apply a first linear acceleration rebalancing force to the first proof mass; a second electrode pair operable to apply a second linear acceleration rebalancing force to the second proof mass; a third electrode pair operable to apply a first Coriolis rebalancing force to the first proof mass; and a fourth electrode pair operable to apply a second Coriolis rebalancing force to the second proof mass.

In accordance with further aspects, an exemplary embodiment applies a first linear acceleration rebalancing force via a first electrode pair to a first proof mass, applies a second linear acceleration rebalancing force via a second electrode pair to a second proof mass, applies a first Coriolis rebalancing force via a third electrode pair to the first proof mass, applies a second Coriolis rebalancing force via a fourth electrode pair to the second proof mass, determines a linear acceleration corresponding to the applied first and second linear acceleration rebalancing forces, and determines a rotation corresponding to the applied first and second Coriolis rebalancing forces.

In accordance with further aspects, another exemplary embodiment senses a change in a first capacitance between a first electrode of a first electrode pair and a first proof mass, senses a change in a second capacitance between a second electrode of the first electrode pair and the first proof mass, senses a change in a third capacitance between a first electrode of a second electrode pair and a second proof mass, senses a change in a fourth capacitance between a second electrode of the second electrode pair and the second proof mass, senses a change in a fifth capacitance between a first electrode of a third electrode pair and the first proof mass, senses a change in a sixth capacitance between a second electrode of the third electrode pair and the first proof mass, senses a change in a seventh capacitance between a first electrode of a fourth electrode pair and the second proof mass, and senses a change in an eighth capacitance between a second electrode of the fourth electrode pair and the second proof mass. The embodiment is operable to determine a linear acceleration from the sensed first capacitance, the sensed second capacitance, the sensed third capacitance, and the sensed fourth capacitance. The embodiment is also operable to determine a rotation from the sensed fifth capacitance, the sensed sixth capacitance, the sensed seventh capacitance, and the sensed eighth capacitance.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
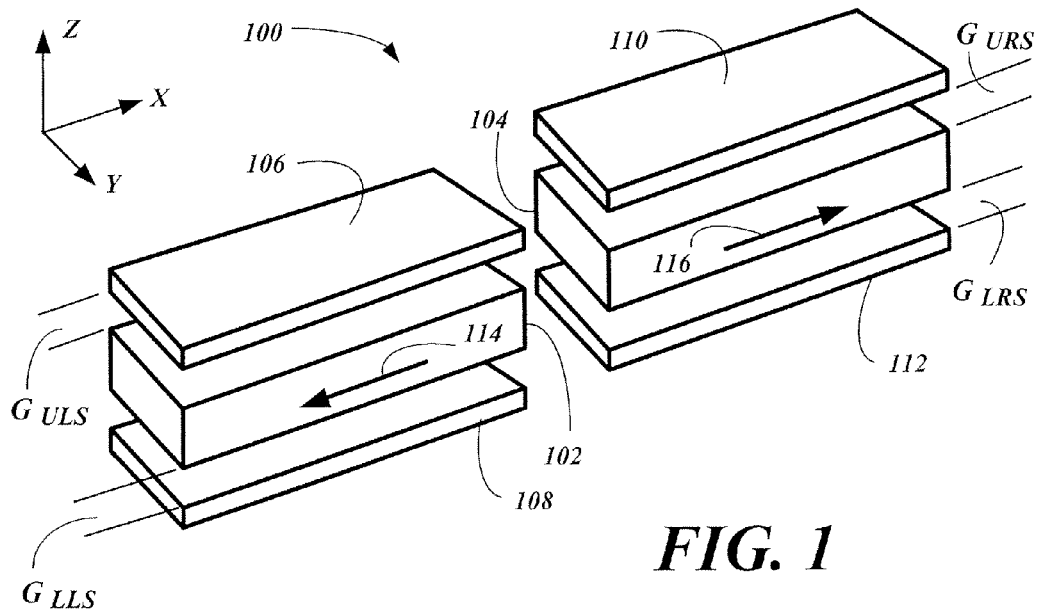
FIG. 1 is a conceptual perspective view of electrodes and proof masses for a portion of an embodiment of the inertial sensor.

Embodiments of the inertial sensor 100 decouple acceleration sensing and rotation sensing so that rotation and acceleration are independently determinable. FIG. 1 is a block diagram of a portion of an embodiment of an inertial sensor 100. The exemplary portion of the inertial sensor 100 is operable to sense either linear acceleration or rotation. Other portions of the inertial sensor 100 that sense rotation are described and illustrated below.

The illustrated portion of the inertial sensor 100 comprises a first proof mass 102 (interchangeably referred to herein as the left proof mass 102) and a second proof mass 104 (interchangeably referred to herein as the right proof mass 104). The left proof mass 102 is between an upper sense electrode 106 (interchangeably referred to herein as the upper left sense (ULS) electrode 106) and a lower sense electrode 108 (interchangeably referred to herein as the lower left sense (LLS) electrode 108). The right proof mass 104 is between an upper sense electrode 110 (interchangeably referred to herein as the upper right sense (URS) electrode 110) and a lower sense electrode 112 (interchangeably referred to herein as the lower right sense (LRS) electrode 112).

The left proof mass 102 is separated from the ULS electrode 106 by a gap ($G_{ULS}$) which defines a capacitance that is dependent upon the separation distance between the left proof mass 102 and the ULS electrode 106. Similarly, the left proof mass 102 is separated from the LLS electrode 108 by a gap ($G_{LLS}$) which defines a capacitance that is dependent upon the separation distance between the left proof mass 102 and the LLS electrode 108. Changes in the capacitances associated with the gaps $G_{ULS}$ and $G_{LLS}$, caused by linear acceleration or rotation is detectable.

The right proof mass 104 is separated from the URS electrode 110 by a gap ($G_{URS}$) which defines a capacitance that is dependent upon the separation distance between the right proof mass 104 and the URS electrode 110. Similarly, the right proof mass 104 is separated from the LRS electrode 112 by a gap ($G_{LRS}$) which defines a capacitance that is dependent upon the separation distance between the right proof mass 104 and the LRS electrode 112. Changes in the capacitances associated with the gaps $G_{URS}$ and $G_{LRS}$, caused by linear acceleration or rotational movement, is detectable.

The proof masses 102, 104 are capacitively coupled to drive electrodes (not shown) which impart a "back-and-forth" motion to the proof masses 102, 104 as an alternating current (AC) voltage is applied to the drive electrodes. The drive electrodes cause the proof masses 102, 104 to oscillate back and forth in resonance along a drive axis (the illustrated x axis). The drive axis and the y axis define an in-plane motion of the proof masses 102, 104. The relative direction of motion of the left proof mass 102, as denoted by the direction vector 114, is opposite from the direction of motion of the right proof mass 104, as denoted by the direction vector 116, during one half cycle of the resonant motion. Thus, the proof masses 102, 104 are illustrated as moving away from each other in FIG. 1. During the next half cycle of the resonant motion, the proof masses 102, 104 move towards each other. It is appreciated that embodiments of the inertial sensor 100 may be implemented in MEMS based devices having various configurations of drive electrodes.

Figure 2:
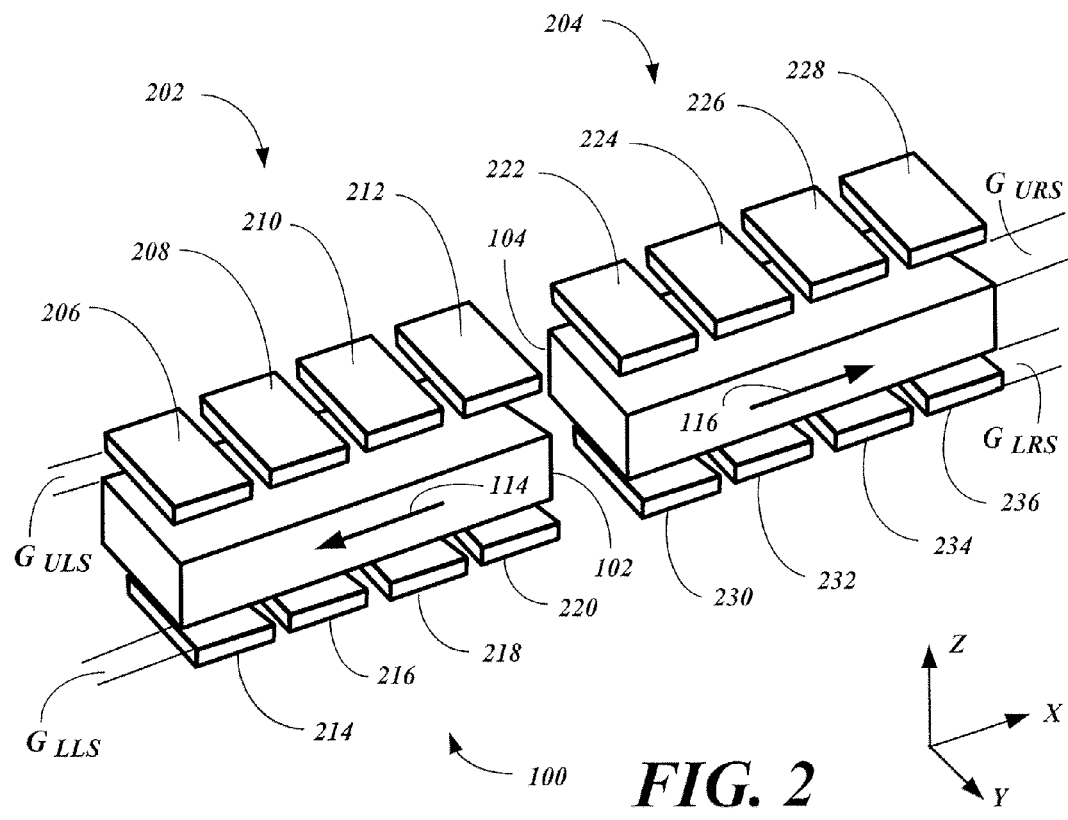
FIG. 2 is a conceptual perspective view of electrodes and proof masses for an alternative embodiment of the inertial sensor.

FIG. 2 is a conceptual perspective view of electrodes and proof masses for an alternative embodiment of the inertial sensor 100. Electrode groups 202, 204 are oriented above and below the proof masses 102, 104, respectively. Electrodes 206, 208, 210 and 212 are oriented above and substantially the same distance from the left proof mass 102 as illustrated, and define the gap $G_{ULS}$. Electrodes 214, 216, 218 and 220 are oriented below and substantially the same distance from the left proof mass 102 as illustrated, and define the gap $G_{LLS}$. Electrodes 222, 224, 226 and 228 are oriented above and substantially the same distance from the right proof mass 104 as illustrated, and define the gap $G_{URS}$. Electrodes 230, 232, 234 and 236 are oriented below and substantially the same distance from the right proof mass 104 as illustrated, and define the gap $G_{LRS}$. In alternative embodiments, the electrodes may be positioned at different distances from their respective proof masses. In other embodiments, arrays of electrodes or a plurality of electrodes may be used to apply one or more of the rebalancing forces described herein.

Opposing electrodes form electrode pairs. For example, electrodes 206 and 214 form an electrode pair. Electrode pairs may be operated in relation to each other, as described in greater detail below. Other electrode pairs include electrodes 208 and 216, electrodes 210 and 218, electrodes 212 and 220, electrodes 222 and 230, electrodes 224 and 232, electrodes 226 and 234, and electrodes 228 and 236. A pair of selected electrodes for each of the proof masses 102, 104 corresponds to the above-described electrodes 106 and 108, or electrodes 110 and 112. The gaps between the proof mass and each of the electrodes of an electrode pair, when a voltage is applied thereacross, results in a detectable capacitance. For example, the gap $G_{ULS}$ between the electrode 208 and the proof mass 102 results in a first capacitance. Similarly, the gap $G_{LLS}$ between the proof mass 102 and the electrode 216 results in a second capacitance. When the proof mass 102 moves, the above described first and second capacitances change. The capacitance changes may be determined by sensing the change in a current from an amplifier (not shown) coupled to the electrode 208 and/or the electrode 216.

Figure 3:
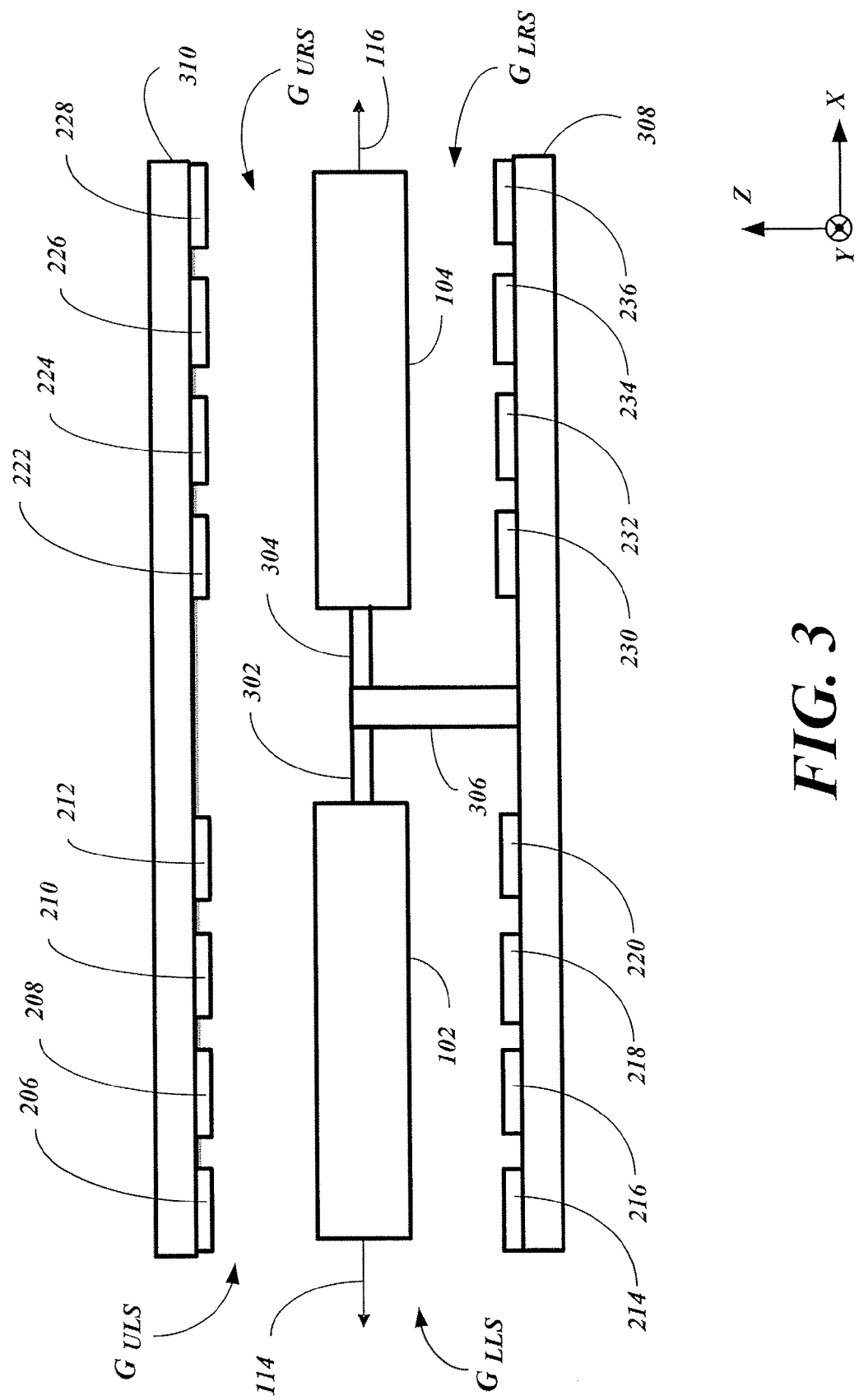
FIG. 3 is a conceptual side view of an embodiment of the inertial sensor.

FIG. 3 is a conceptual side view of an embodiment of the inertial sensor 100. Here, the proof masses 102, 104 are illustrated as aligned with each other along the x axis. A flexure 302 supports the left proof mass 102 between the gaps $G_{ULS}$ and $G_{LLS}$. A flexure 304 supports the right proof mass 104 between the gaps $G_{URS}$ and $G_{LRS}$. The flexures 302 and 304 are attached to anchor 306. In this exemplary embodiment, anchor 306 is attached to the lower substrate 308, although the anchor 306 may be attached to the upper substrate 310, or may be attached to both substrates 308, 310, in alternative embodiments. The flexures 302, 304 are flexible members that have spring-like characteristics such that when the proof masses 102, 104 are driven by the drive electrodes (not shown), the proof masses 102, 104 will resonate.

In other embodiments, the anchor 306 may be attached to the upper substrate 310. Some embodiments may employ a plurality of flexures to couple the proof masses 102, 104 to various anchor points in the MEMS device. In some embodiments, the flexures 302, 304 may be connected to different anchors.

In the exemplary embodiment of the inertial sensor 100, the proof masses 102, 104 are suspended such that the gaps $G_{ULS}$ and $G_{LLS}$, and the gaps $G_{URS}$ and $G_{LRS}$, are equal to each other. Accordingly, the upper and lower capacitances associated with the proof masses 102, 104 and the illustrated electrodes are substantially equal (with respect to each other). For example, assuming that the surface areas and other characteristics of the electrodes 206, 214, 228, and 236 are substantially the same, the capacitance between the electrode 206 and the left proof mass 102, the capacitance between the electrode 214 and the left proof mass 102, the capacitance between the electrode 228 and the right proof mass 104, and the capacitance between the electrode 236 and the right proof mass 104, are substantially the same. In alternative embodiments, the capacitances may be different from each other.

A linear acceleration in a direction along the illustrated z axis causes the proof masses 102, 104 to move together in the same direction and at substantially the same rate and/or distance. This movement is referred to herein as movement in a "common mode." The common mode movement of the proof masses 102, 104 causes substantially the same change in the electrode-to-proof mass capacitance of electrode pairs across the gaps $G_{ULS}$ and $G_{URS}$, and substantially the same change in the electrode-to-proof mass capacitance of the electrode pairs across gaps $G_{LLS}$ and $G_{LRS}$. That is, assuming that the upper and lower gaps ($G_{URS}$, $G_{LRS}$, $G_{ULS}$, and $G_{URS}$) are the same (i.e.: balanced), the magnitudes of the changed capacitance of electrode pairs across the gaps $G_{ULS}$ and $G_{URS}$, and the magnitudes of the changed capacitance of the electrode pairs across gaps $G_{LLS}$ and $G_{LRS}$, are substantially the same. If the gaps $G_{ULS}$, $G_{LLS}$, $G_{URS}$, and $G_{LRS}$, are unbalanced, the upper capacitances vary substantially the same amount, and the lower capacitances vary substantially the same amount, since the forces which move the proof masses 102, 104 that result in the change of these capacitances are nearly equal. Linear acceleration can be determined from the sensed common mode changes in capacitance.

Further, a rotation in a direction around the illustrated y axis causes the proof masses 102, 104 to move in opposite directions and at substantially the same rate and/or distance in the z direction. This movement is referred to herein as movement in a "differential mode." The differential mode movement of the proof masses 102, 104 is caused by Coriolis forces. This differential mode movement of the proof masses 102, 104 (movement in opposite directions) causes substantially the same magnitudes of change in the electrode-to-proof mass capacitance of electrode pairs across the gaps $G_{ULS}$ and $G_{LRS}$, and substantially the same magnitudes of change in the electrode-to-proof mass capacitance of the electrode pairs across gaps $G_{LLS}$ and $G_{URS}$. Rotation can be determined from the sensed differential mode changes in capacitance.

As noted above, embodiments of the inertial sensor 100 provide decoupling between acceleration sensing and rotation sensing so that rotation and acceleration are independently sensed and determined. In the preferred embodiment, the quadrature forces, which are ninety degrees out-of-phase from the Coriolis forces, are also decoupled from the acceleration and Coriolis forces. Accordingly, rebalancing forces for linear acceleration, Coriolis, and/or quadrature forces are separately applied to electrode pairs to maintain the position of the proof masses 102, 104 in a fixed position such that the capacitances associated with the respective electrode pairs across gaps $G_{ULS}$, $G_{LLS}$, $G_{URS}$, and $G_{LRS}$, are substantially matched. Thus, when an unbalance between the positions of the proof masses 102, 104 occurs (detectable from the changes in the electrode-to-proof mass capacitances of the electrode pairs across the gaps $G_{ULS}$, $G_{LLS}$, $G_{URS}$, and $G_{LRS}$), rebalancing forces operate to self center the proof masses 102, 104.

A Coriolis rebalancing force is applied to proof mass 102 by a selected electrode pair. A Coriolis rebalancing force is also applied to proof mass 104 by another selected electrode pair. The applied Coriolis rebalancing force self centers the proof masses 102, 104 during a rotation of the inertial sensor 100. The magnitude of the required Coriolis rebalancing force corresponds to the amount of rotation. Similarly, an applied linear acceleration rebalancing forces self center the proof masses 102, 104 during a linear acceleration of the inertial sensor 100. The magnitude of the required linear acceleration rebalancing force corresponds to the amount of linear acceleration. Since the linear acceleration rebalancing force is provided by a direct current (DC) voltage applied to selected electrode pairs, the linear acceleration rebalancing force can be differentiated from the Coriolis rebalancing force. That is, because a linear acceleration (which induces a time varying acceleration force in the z-axis) is different from a rotation (which induces a force that is modulated at the drive frequency of the proof masses 102, 104), the linear acceleration rebalancing force and the Coriolis rebalancing force can be separately determined.

Figure 4:
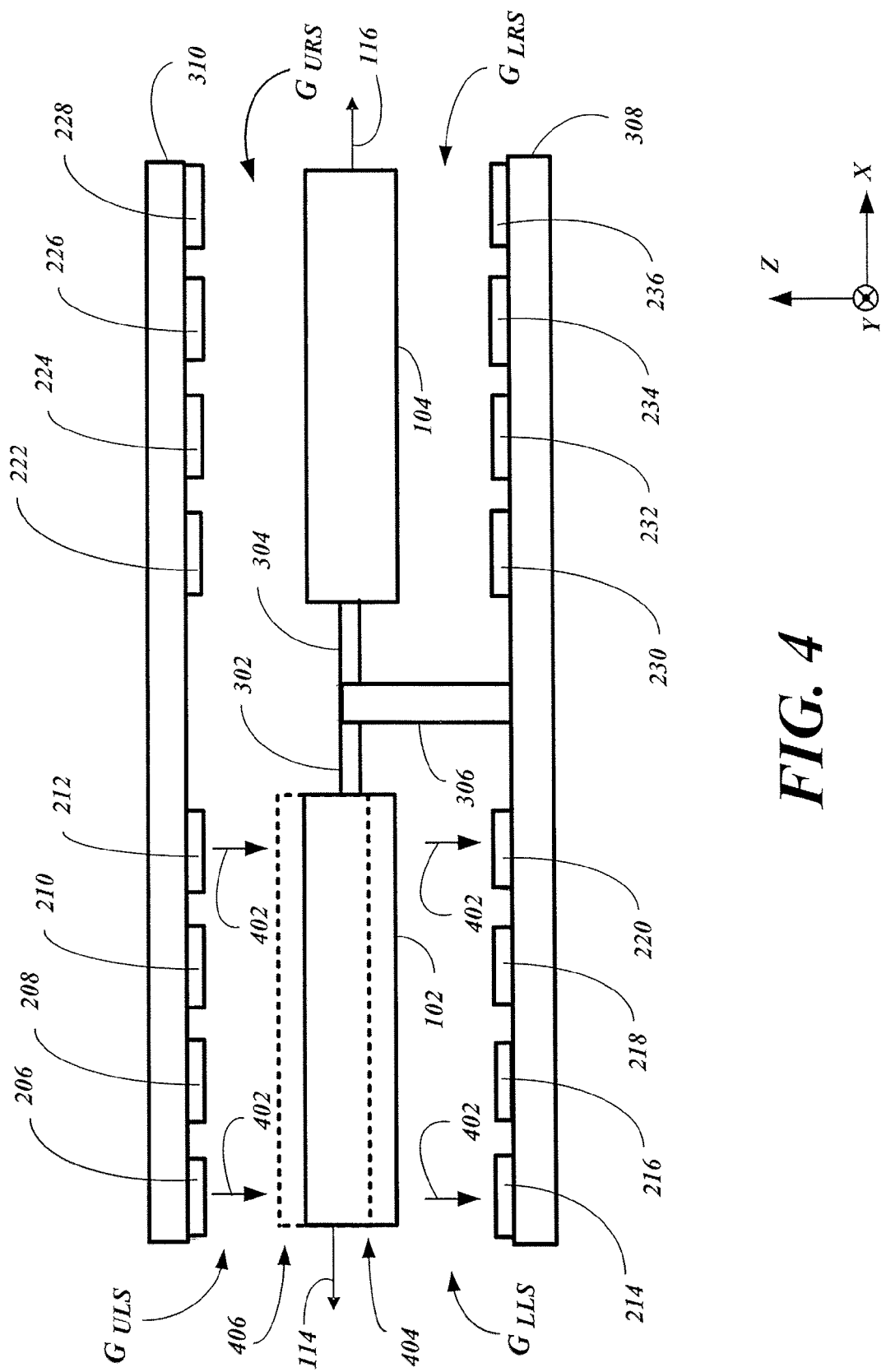
FIG. 4 is a conceptual side view of an embodiment of the inertial sensor with applied initialization rebalancing forces.

FIG. 4 is a conceptual side view of an embodiment of the inertial sensor 100 with applied initialization rebalancing forces 402, illustrated as vectors 402. Selected electrodes may be operated to exert an initialization rebalancing force to its respective proof mass 102, 104. Accordingly, the gaps $G_{ULS}$, $G_{LLS}$, $G_{URS}$, and $G_{LRS}$, may be set to be equal to each other, or set to a desired value.

For example, as conceptually illustrated in FIG. 4, during fabrication of an inertial sensor 100, the left proof mass 102 may not be in its designed ideal position 404 between the electrodes. Here, the left proof mass 102 is illustrated in a non-ideal position 406 such that the gaps $G_{ULS}$ and $G_{LLS}$ are not substantially equal. The non-ideal position 406 of the left proof mass 102, even though acceptable from a fabrication perspective, may be sufficiently different from the ideal position 404 as a result of design and/or fabrication tolerances so as to impart inaccuracies in the detection of linear accelerations and/or rotational movement. Initialization rebalancing forces, illustrated as vectors 402, may be applied by one or more selected electrodes to reposition the left proof mass 102 to, or very near to, its designed ideal position 404. The initialization rebalancing forces may be equal, or may be unique, depending upon the amount of initialization rebalancing required to position a proof mass into its ideal position. Preferably, the initialization rebalancing forces result from DC biases applied to the selected electrodes. The initialization rebalancing forces may be determined prior to use of the inertial sensor 100, such as by bench testing after fabrication.

Figure 5:
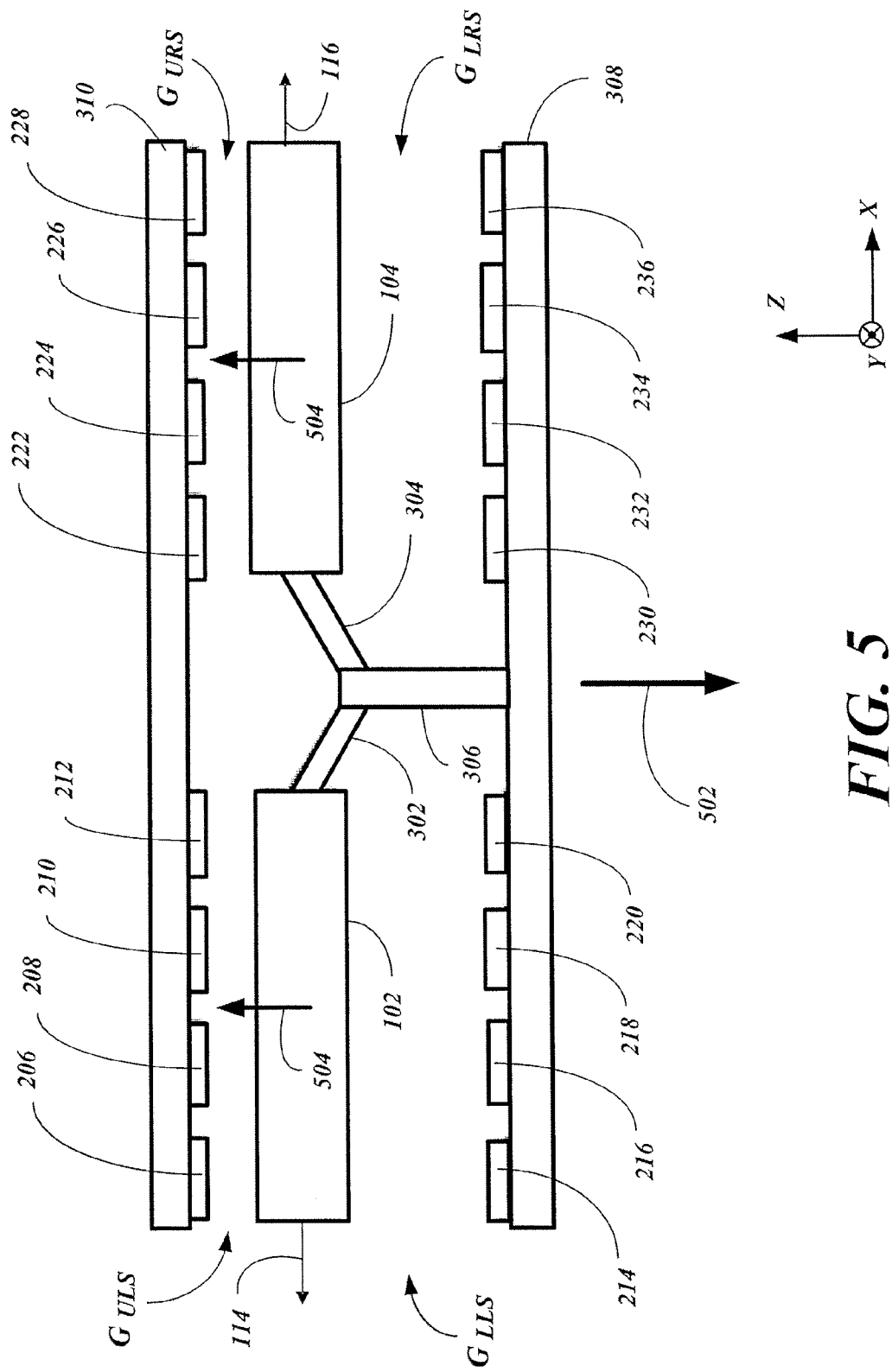
FIG. 5 is a conceptual side view of an embodiment of the inertial sensor with an applied linear acceleration.

FIG. 5 is a conceptual side view of an embodiment of the inertial sensor 100 with an applied linear acceleration, denoted by the acceleration vectors 502 (corresponding to a movement in the negative z axis direction). Inertial forces (illustrated as vectors 504) are exerted on the proof masses 102, 104. Accordingly, the proof masses 102, 104 are moved towards the upper substrate 310 during the period of acceleration. The flexures 302, 304 will operate to return the proof masses 102, 104 to their initial positions (see FIG. 3) when the acceleration ceases.

The above-described common mode movement of the proof masses 102, 104 causes substantially the same change in the electrode-to-proof mass capacitance of electrode pairs across the gaps $G_{ULS}$ and $G_{LLS}$, and the electrode pairs across the gaps $G_{URS}$ and $G_{LRS}$, respectively. That is, the magnitude of the changed electrode-to-proof mass capacitance of electrode pairs across the gaps $G_{ULS}$ and $G_{URS}$, and the magnitude of the changed electrode-to-proof mass capacitance of electrode pairs across the gaps $G_{LLS}$ and $G_{LRS}$, are substantially the same. In response to the movement of the proof masses 102, 104, a linear acceleration rebalancing force may be applied via selected electrode pairs to reposition the proof masses 102, 104 back to their original position. Linear acceleration can be determined from the amount of the applied linear acceleration rebalancing force and/or from the sensed common mode changes in capacitance.

Figure 6:
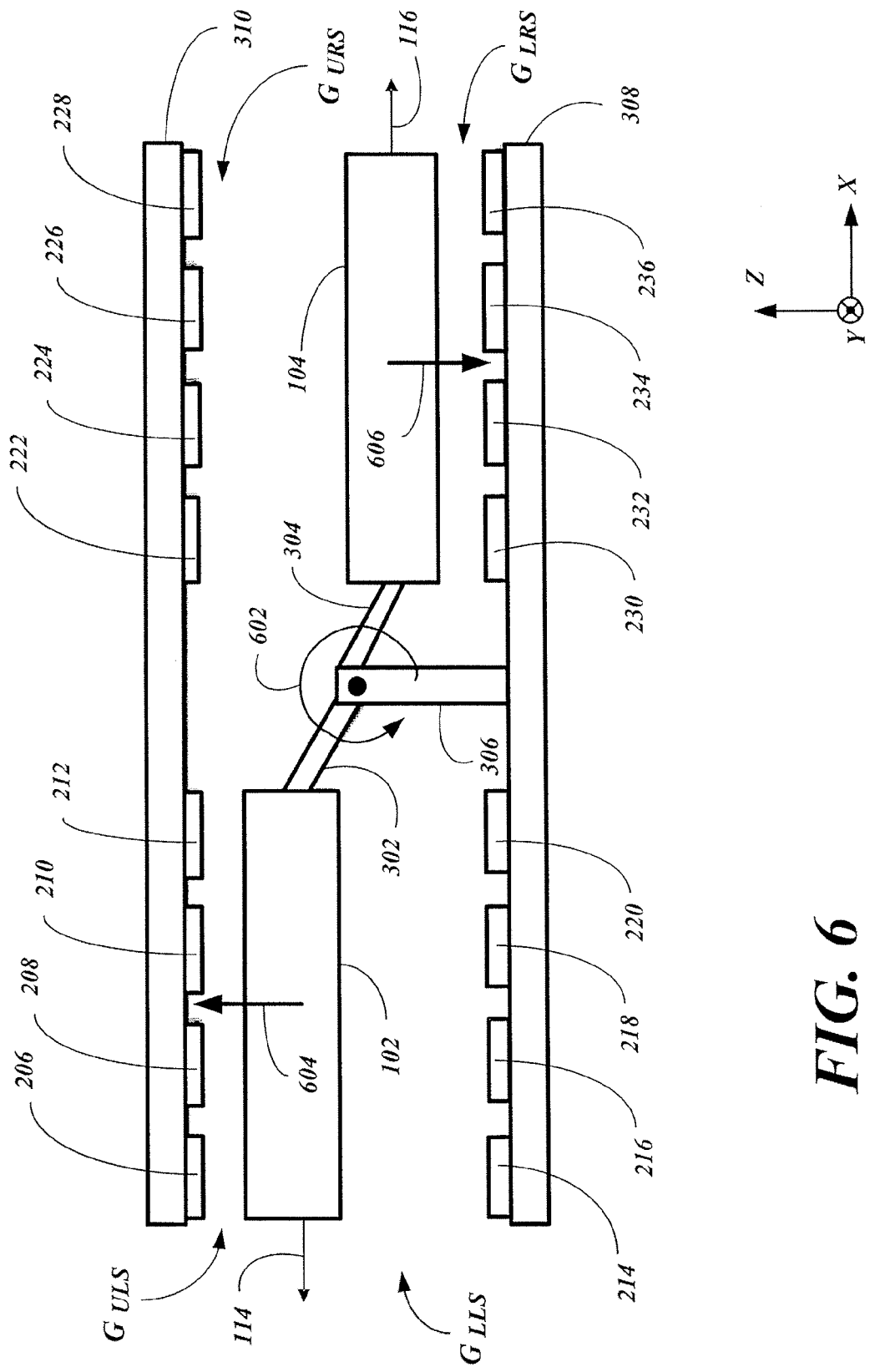
FIG. 6 is a conceptual side view of an embodiment of the inertial sensor with an applied rotation.

FIG. 6 is a conceptual side view of an embodiment of the inertial sensor 100 with an applied rotation, denoted by the rotation vector 602, (corresponding to a rotation movement around the y axis). Inertial forces, illustrated as vectors 604 and 606, are exerted on the proof masses 102, 104, respectively. Accordingly, the proof mass 102 is moved towards the upper substrate 310 during the period of rotation and the proof mass 104 is moved towards the lower substrate 308 during the period of rotation. The flexures 302, 304 will operate to return the proof masses 102, 104 to their initial positions (see FIG. 3) when the rotation ceases.

The above-described differential mode movement of the proof masses 102, 104 causes a detectable change in the electrode-to-proof mass capacitance of electrode pairs across the gaps $G_{ULS}$, $G_{LLS}$, $G_{URS}$, and $G_{LRS}$. The magnitude of the changed electrode-to-proof mass capacitance of electrode pairs across the gaps $G_{ULS}$ and $G_{LRS}$, and the magnitude of the changed electrode-to-proof mass capacitance of electrode pairs across the gaps $G_{LLS}$ and $G_{URS}$, are substantially the same (assuming initial balancing of the gaps $G_{URS}$, $G_{LRS}$, $G_{ULS}$, and $G_{URS}$). In response to the movement of the proof masses 102, 104, a Coriolis rebalancing force may be applied via selected electrode pairs to reposition the proof masses 102, 104 back to their original position. Rotation can be determined from the applied Coriolis rebalancing force and/or from the sensed differential mode changes in capacitance.

Figure 7:
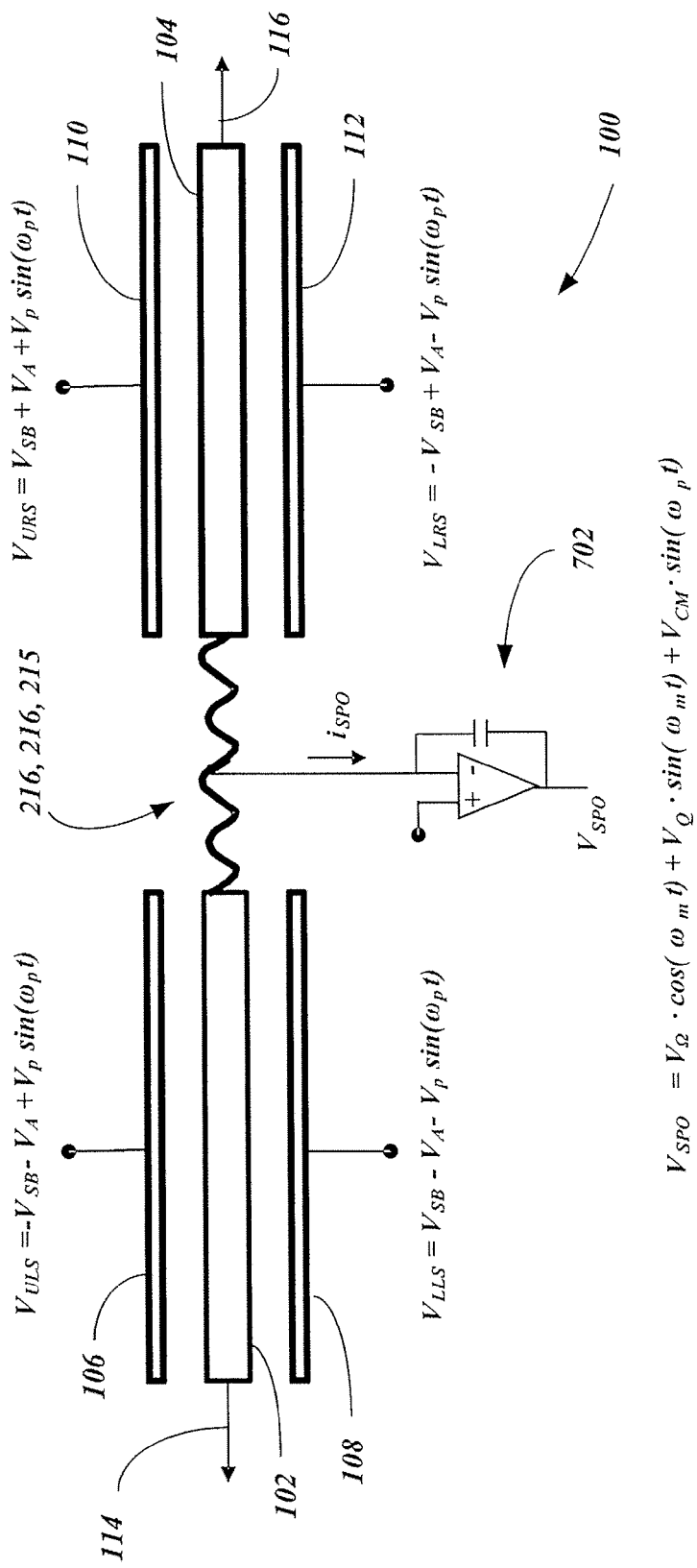
FIGS. 7-9 illustrate applied and sensing voltages for embodiments of the inertial sensor.

FIG. 7 illustrates applied and sensing voltages for a portion of an embodiment of the inertial sensor 100 illustrated in FIG. 1. The voltages $V_{ULS}$, $V_{LLS}$, applied by the electrode pair 106 and 108, and the voltages $V_{URS}$, and $V_{LRS}$, applied by the electrode pair 110 and 112, correspond in part to the linear acceleration rebalancing force.

The applied voltages have three components that provide three functions, linear acceleration rebalancing, rotation sense biasing, and acceleration sense pickoff. The applied upper left sense plate voltage ($V_{ULS}$) may be defined by equation (1) below:

$$V_{ULS} = -V_{SB} - V_A + V_p \sin(\omega_p t) \quad (1)$$

where $V_{SB}$ is the applied voltage of the sense bias (a DC bias voltage), where $V_A$ is the voltage of the applied linear acceleration rebalancing force, where $V_p$ is an applied AC pick off voltage, and where $\omega_p$ is the frequency of the applied AC pick off voltage $V_p$. The current $i_{SPO}$ results from imbalances in the position of the proof masses 102, 104.

The applied lower left sense plate voltage ($V_{LLS}$), the applied upper right sense plate voltage ($V_{URS}$), and the applied lower right sense plate voltage ($V_{LRS}$), may be defined by equations (2), (3), and (4), respectively, below:

$$V_{LLS} = V_{SB} - V_A - V_p \sin(\omega_p t) \quad (2)$$

$$V_{URS} = V_{SB} + V_A + V_p \sin(\omega_p t) \quad (3)$$

$$V_{LRS} = -V_{SB} + V_A - V_p \sin(\omega_p t) \quad (4)$$

An amplifier system 702 is communicatively coupled to detect voltages and/or currents from the proof masses 102, 104. The output of the amplifier system 702 corresponds to the sensed pick off voltage, $V_{SPO}$. $V_{SPO}$ may be defined by equation (5) below.

$$V_{SPO} = [V_\Omega \cdot \cos(\omega_m t)] + [V_Q \cdot \sin(\omega_m t)] + [V_{CM} \cdot \sin(\omega_p t)] \quad (5)$$

where $V_\Omega$ is the portion of $V_{SPO}$ that is proportional to the rotation motion, where $V_Q$ is the quadrature component of $V_\Omega$, where $V_{CM}$ is the portion of $V_{SPO}$ that is proportional to the common mode motion (caused by the linear acceleration), and where $\omega_m$ is the applied motor frequency.

Figure 8:
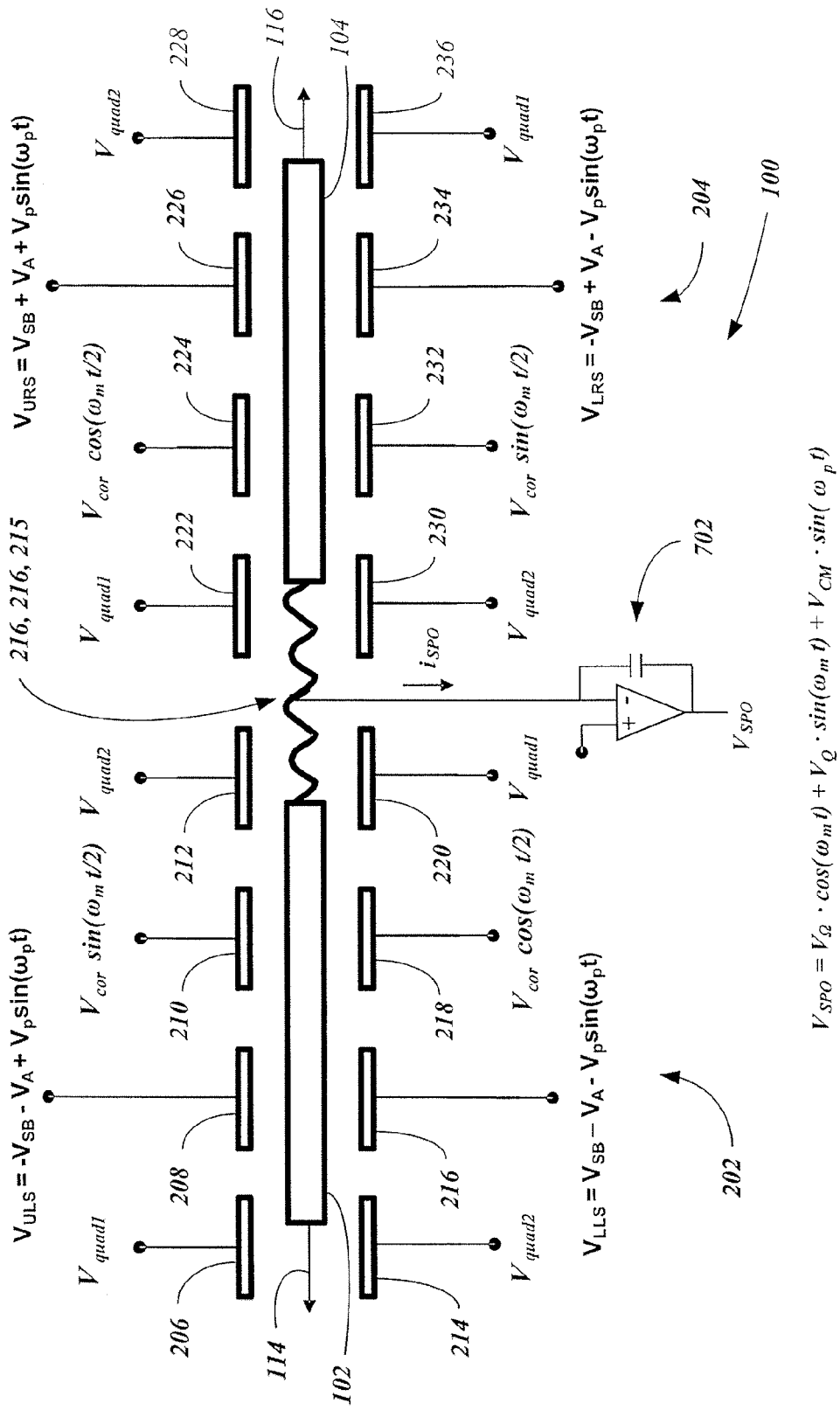

FIG. 8 illustrates applied and sensing voltages for the embodiment of the inertial sensor 100. Included are the above-described applied voltages $V_{ULS}$, $V_{LLS}$, $V_{URS}$, and $V_{LRS}$, corresponding to the linear acceleration rebalancing force, which are applied by the electrode pair 208, 216 to proof mass 102, and by the electrode pair 226, 234 to proof mass 104. Other embodiments may apply the linear acceleration rebalancing force using different selected electrodes. In some embodiments, the electrodes 208, 216, 226, and 234 may be used to inject currents (or voltages) used for sensing common mode movement and/or differential mode movement of the proof masses 102, 104.

The electrode pair 210, 218 provides a Coriolis rebalancing force to the proof mass 102. Similarly, the electrode pair 224, 232 applies a Coriolis rebalancing force to the proof mass 104. Preferably, the Coriolis rebalancing force applied to the proof mass 102 is opposite in direction and of equal magnitude to the Coriolis rebalancing force applied to the proof mass 104. Other embodiments may apply the Coriolis rebalancing force using different selected electrodes.

The Coriolis rebalancing force, corresponding to $V_{CUL}$, applied by electrode 210 may be defined by equation (6) below:

$$V_{CUL} = V_{COR} \sin(\omega_m t/2) \quad (6)$$

where $V_{COR}$ is a Coriolis voltage, and where $\omega_m t/2$ is the one half of the frequency of the motor frequency of proof masses 102, 104.

The Coriolis rebalancing force, corresponding to $V_{CLL}$, applied by electrode 218, the Coriolis rebalancing force, corresponding to $V_{CUR}$, applied by electrode 224, and the Coriolis rebalancing force, corresponding to $V_{CLR}$, applied by electrode 232, may be defined by equations (7), (8), and (9), respectively, below:

$$V_{CLL} = V_{COR} \cos(\omega_m t/2) \quad (7)$$

$$V_{CUR} = V_{COR} \cos(\omega_m t/2) \quad (8)$$

$$V_{CLR} = V_{COR} \sin(\omega_m t/2) \quad (9)$$

Some embodiments may apply optional quadrature rebalancing forces via the optional electrodes 206, 214, 228, and 236. The quadrature rebalancing forces are proportional to the induced motor motion of the proof masses 102, 104. In the exemplary embodiments illustrated in FIGS. 2-9, four electrodes are illustrated (at each end of the proof masses 102, 104) that are used for the application of quadrature rebalancing forces. In alternative embodiments, a single electrode pair for each of the proof masses 102, 104 may be used to apply quadrature rebalancing forces. The single pair of quadrature rebalancing electrodes may be placed in any suitable position with respect to its proof masse 102, 104. In alternative embodiments, quadrature rebalancing electrodes are optional or are not used.

Figure 9:
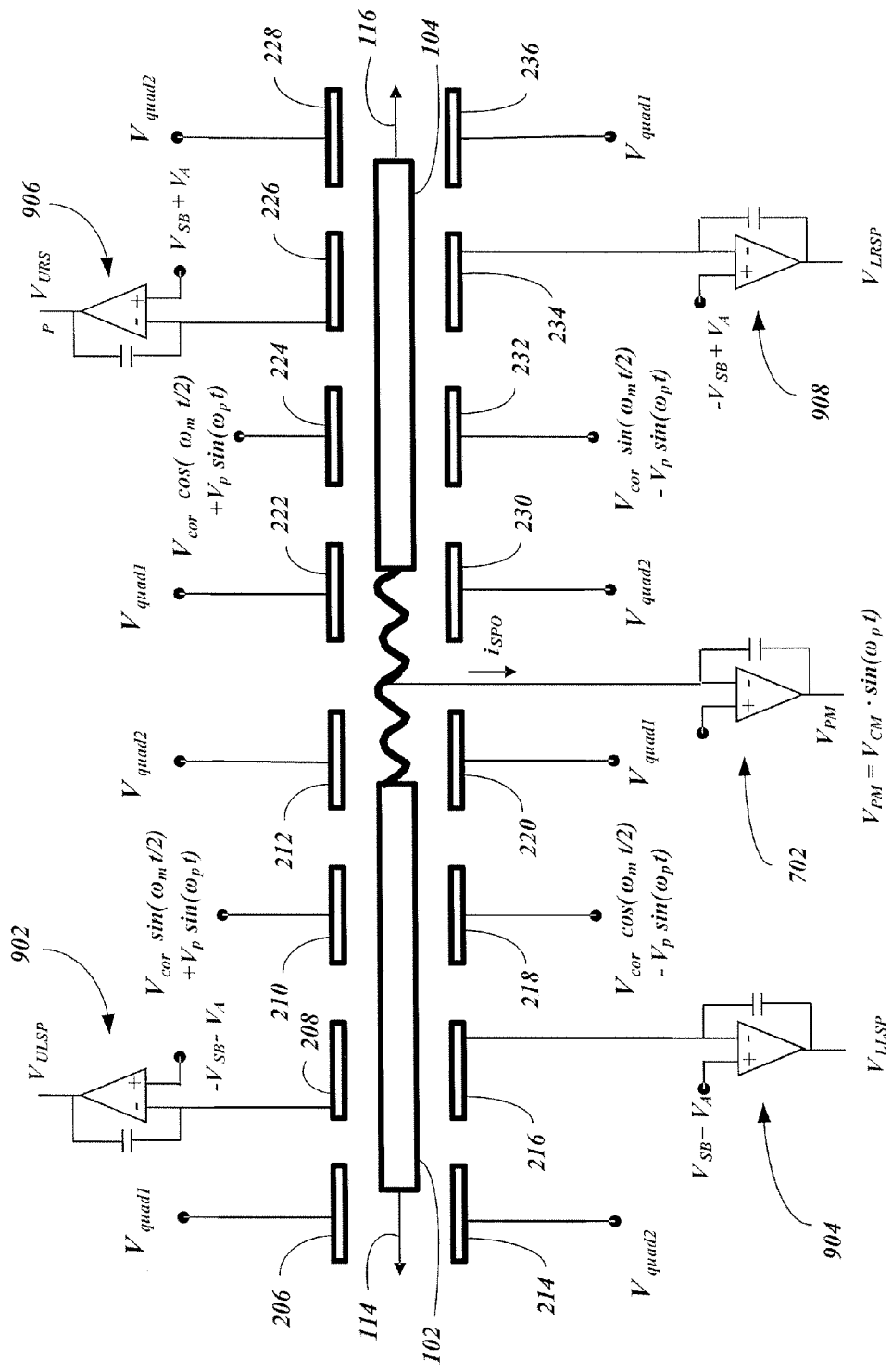

FIG. 9 illustrates applied voltages and sensing voltages for an alternative embodiment of the inertial sensor 100. The electrodes 208, 216, 226, and 234 are coupled to pick off amplifier systems 902, 904, 906, and 908, respectively, to sense or pick off voltages at their respective electrodes. This embodiment allows compensation of parasitic signals injected into the proof masses 102, 104, which may result in undesirable applied parasitic forces. That is, parasitic coupling effects between the rotational forces and the linear acceleration forces may be mitigated since the frequency of parasitic terms will be higher ($\omega_p+\omega_m/2$).

The amplifier system 902 outputs a signal $V_{ULSP}$. The amplifier systems 904, 906, and 908, output the signals $V_{LLSP}$, $V_{URSP}$, and $V_{LRSP}$, respectively. Rotational output, $V_{RATE}$, may be derived from the output of the amplifier systems 902, 904, 906, and 908, in accordance with equation (10), below:

$$V_{RATE}=V_{ULSP}+V_{LRSP}-V_{LLSP}-V_{URSP} \qquad (10)$$

Figure 10:
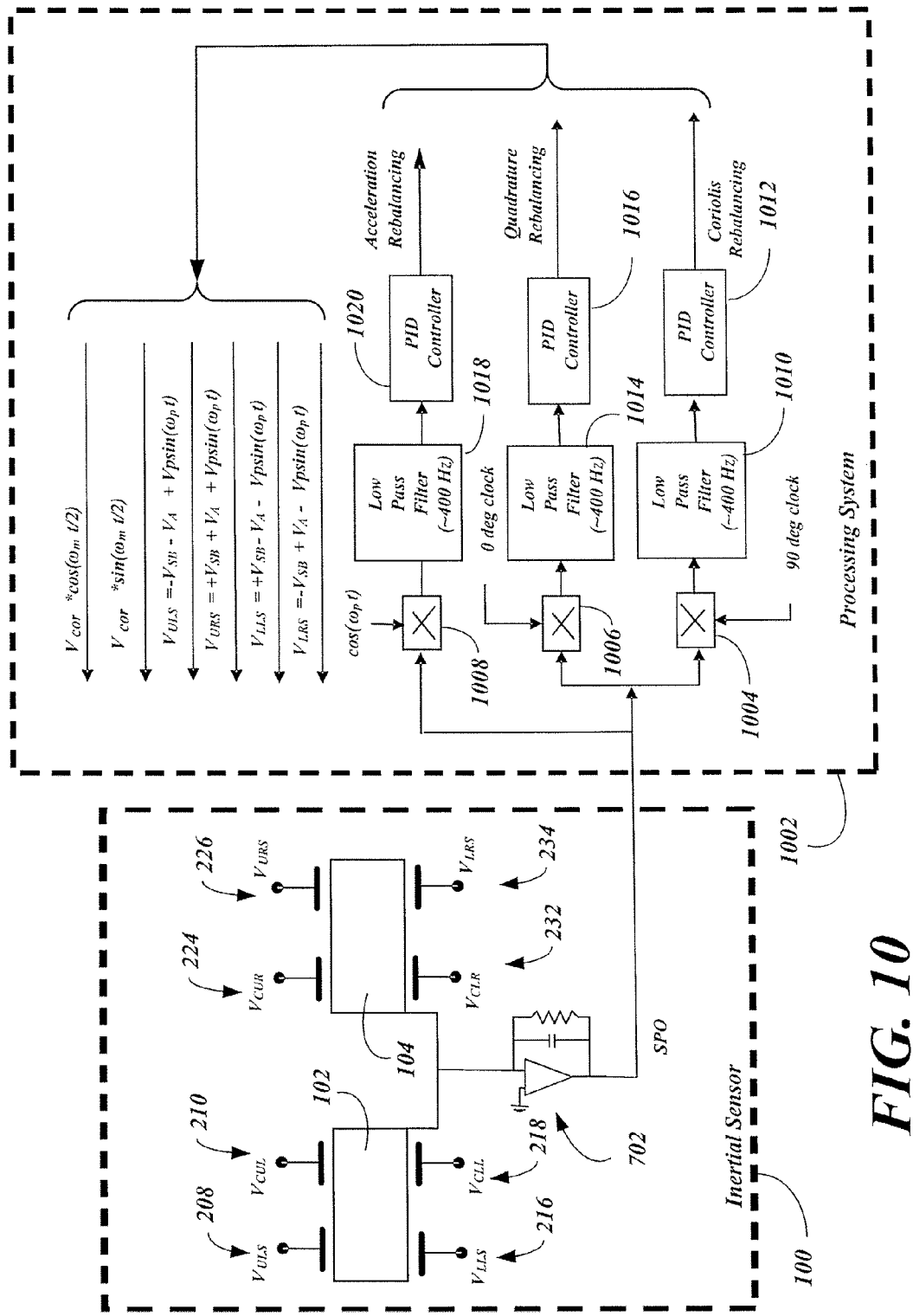
FIG. 10 is a block diagram illustrating an exemplary implementation of a digital signal processing system coupled to an embodiment of the inertial sensor.

FIG. 10 is a block diagram illustrating an exemplary implementation of a processing system 1002 coupled to an embodiment of the inertial sensor 100. In an exemplary embodiment, the processing system is a digital signal processing (DSP) electronics system. The processing system 1002 may be implemented as an analog, as a digital system, or a combination thereof, and may be implemented as software, hardware, or a combination of hardware and software, depending upon the particular application.

The amplifier system 702 provides the sensed pick off voltage, $V_{SPO}$, to the processing system 1002. Demodulators 1004, 1006 and 1008 demodulate $V_{SPO}$ by stripping off the AC portions of $V_{SPO}$. The 90 degree clock applied to demodulator 1004 and the 0 degree clock applied to demodulator 1006 correspond to a multiplied motor signal at different phases (90 degrees and 0 degrees, respectively).

The low pass filter 1010 processes the output of the demodulator 1004 and outputs a Coriolis output signal to a proportional-integral-derivative (PID) controller 1012. A low pass filter 1014 and a PID controller 1016 process the output of the demodulator 1004 and outputs a quadrature output signal. A low pass filter 1018 and a PID controller 1020 process the output of the demodulator 1008 and outputs an acceleration output signal corresponding to the common mode imbalance in capacitance. The output signals are used to generate the outputs $V_{ULS}$, $V_{LLS}$, $V_{URS}$, and $V_{LRS}$, corresponding to the above-described linear acceleration rebalancing force, and are used to generate the outputs $V_{CUL}$, $V_{CLL}$, $V_{CUR}$, and $V_{CLR}$, corresponding to the above-described Coriolis rebalancing force.

Embodiments of the inertial sensor 100, operable to sense and determine linear acceleration and rotation, may be incorporated into an inertial measurement unit. Since one inertial sensor 100 sense linear acceleration and rotation, three inertial sensors 100 may be used to construct one inertial measurement unit rather than the three gyroscopes and the three accelerometers used in a conventional inertial measurement unit. Accordingly, costs and/or size may be reduced since fewer components are used.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for determining linear acceleration and rotation of a Micro-Electro-Mechanical Systems (MEMS) inertial sensor, comprising:
    applying a first linear acceleration rebalancing force via a first electrode pair to a first proof mass;
    applying a second linear acceleration rebalancing force via a second electrode pair to a second proof mass;
    applying a first Coriolis rebalancing force via a third electrode pair to the first proof mass;
    applying a second Coriolis rebalancing force via a fourth electrode pair to the second proof mass;
    determining a linear acceleration corresponding to the applied first and second linear acceleration rebalancing forces; and
    determining a rotation corresponding to the applied first and second Coriolis rebalancing forces.

2. The method of claim 1, further comprising:
    detecting a pick off voltage $V_{SPO}$ from the first and second proof masses;
    determining a rebalancing voltage $V_{ULS}$ that is applied to a first electrode of the first electrode pair from the pick off voltage $V_{SPO}$;
    determining a rebalancing voltage $V_{LLS}$ that is applied to a second electrode of the first electrode pair from the pick off voltage $V_{SPO}$;
    determining a rebalancing voltage $V_{URS}$ that is applied to a first electrode of the second electrode pair from the pick off voltage $V_{SPO}$; and
    determining a rebalancing voltage $V_{LRS}$ that is applied to a second electrode of the second electrode pair from the pick off voltage $V_{SPO}$,
    wherein the first linear acceleration rebalancing force at the first electrode pair corresponds to $V_{ULS}$ and $V_{LLS}$, and wherein the second linear acceleration rebalancing force at the second electrode pair corresponds to $V_{URS}$ and $V_{LRS}$.

3. The method of claim 2, further comprising:
    determining the rebalancing voltage $V_{ULS}$ in accordance with a first equation defined by $V_{ULS}=-V_{SB}-V_A+V_p \sin(\omega_p t)$;
    determining the rebalancing voltage $V_{LLS}$ in accordance with a second equation defined by $V_{LLS}=V_{SB}-V_A-V_p \sin(\omega_p t)$;
    determining the rebalancing voltage $V_{URS}$ in accordance with a third equation defined by $V_{URS}=V_{SB}+V_A+V_p \sin(\omega_p t)$; and
    determining the rebalancing voltage $V_{LRS}$ in accordance with a fourth equation defined by $V_{LRS}=-V_{SB}+V_A-V_p \sin(\omega_p t)$,
    wherein $V_{SB}$ is an applied voltage of a sense bias, where $V_A$ is a voltage of the applied linear acceleration rebalancing force, where $V_p$ is an applied AC pick off voltage, and where $\omega_p$ is a frequency of the applied AC pick off voltage $V_p$.

4. The method of claim 1, further comprising:
    detecting a pick off voltage $V_{SPO}$ from the first and second proof masses;
    determining a Coriolis voltage $V_{CUL}$ that is applied to a first electrode of the third electrode pair from the pick off voltage $V_{SPO}$;
    determining a Coriolis voltage $V_{CLL}$ that is applied to a second electrode of the third electrode pair from the pick off voltage $V_{SPO}$;
    determining a Coriolis voltage $V_{CUR}$ that is applied to a first electrode of the fourth electrode pair from the pick off voltage $V_{SPO}$; and
    determining a Coriolis voltage $V_{CLR}$ that is applied to a second electrode of the fourth electrode pair from the pick off voltage $V_{SPO}$,
    wherein the first Coriolis rebalancing force at the first electrode pair corresponds to $V_{CUL}$ and $V_{CLL}$, and wherein the second Coriolis rebalancing force at the second electrode pair corresponds to $V_{CUR}$ and $V_{CLR}$.

5. The method of claim 4, further comprising:
   determining the Coriolis voltages $V_{CUL}$ and $V_{CLR}$ in accordance with a first equation defined by $V_{CUL} = V_{CLR} = V_{COR} \sin(\omega_m t/2)$; and
   determining the Coriolis voltages $V_{CLL}$ and $V_{CUR}$ in accordance with a second equation defined by $V_{CLL} = V_{CUR} = V_{COR} \cos(\omega_m t/2)$,
   wherein $V_{COR}$ is a Coriolis voltage, and wherein $\omega_m t/2$ is one half of a frequency of a motor frequency of the first and second proof masses.

6. The method of claim 1, further comprising:
   applying a first quadrature rebalancing force to the first proof mass via a fifth electrode pair and a sixth electrode pair; and
   applying a second quadrature rebalancing force to the second proof mass via a seventh electrode pair and an eighth electrode pair.

7. The method of claim 1, further comprising:
   applying an initialization rebalancing force to the first proof mass via the first electrode pair to move the first proof mass from a non-ideal position to an ideal position.

8. The method of claim 1, wherein the linear acceleration is determined from the applied first and second linear acceleration rebalancing forces, and wherein the rotation is determined from the applied first and second Coriolis rebalancing forces.

9. The method of claim 1, wherein the linear acceleration is determined from a change in a capacitance associated with the first electrode pair and the second electrode pair, and wherein the rotation is determined from a change in a capacitance associated with the third electrode pair and the fourth electrode pair.

10. A Micro-Electro-Mechanical Systems (MEMS) inertial sensor for determining linear acceleration and rotation, comprising:
    a first proof mass:
    a second proof mass;
    a first electrode pair operable to apply a first linear acceleration rebalancing force to the first proof mass;
    a second electrode pair operable to apply a second linear acceleration rebalancing force to the second proof mass;
    a third electrode pair operable to apply a first Coriolis rebalancing force to the first proof mass; and
    a fourth electrode pair operable to apply a second Coriolis rebalancing force to the second proof mass.

11. The MEMS inertial sensor of claim 10, further comprising:
    a processing system operable to determine a linear acceleration from the applied first and second linear acceleration rebalancing forces and operable to determine a rotation from the applied first and second Coriolis rebalancing forces.

12. The MEMS inertial sensor of claim 10, further comprising:
    an amplifier system communicatively coupled to the first proof mass and the second proof mass, and operable to output a pick off voltage $V_{SPO}$,
    wherein a rebalancing voltage $V_{ULS}$ that is applied to a first electrode of the first electrode pair is determinable from the pick off voltage $V_{SPO}$,
    wherein a rebalancing voltage $V_{LLS}$ that is applied to a second electrode of the first electrode pair is determinable from the pick off voltage $V_{SPO}$,
    wherein a rebalancing voltage $V_{URS}$ that is applied to a first electrode of the second electrode pair is determinable from the pick off voltage $V_{SPO}$,
    wherein a rebalancing voltage $V_{LRS}$ that is applied to a second electrode of the second electrode pair is determinable from the pick off voltage $V_{SPO}$, and
    wherein the first linear acceleration rebalancing force at the first electrode pair corresponds to $V_{ULS}$ and $V_{LLS}$, and wherein the second linear acceleration rebalancing force at the second electrode pair corresponds to $V_{URS}$ and $V_{LRS}$.

13. The MEMS inertial sensor of claim 12, further comprising:
    a first pick off amplifier system communicatively coupled to the first electrode of the first electrode pair and operable to output a voltage $V_{ULSP}$;
    a second pick off amplifier system communicatively coupled to the second electrode of the first electrode pair and operable to output a voltage $V_{LLSP}$;
    a third pick off amplifier system communicatively coupled to the first electrode of the second electrode pair and operable to output a voltage $V_{URSP}$; and
    a fourth pick off amplifier system communicatively coupled to the second electrode of the second electrode pair and operable to output a voltage $V_{LRSP}$.

14. The MEMS inertial sensor of claim 10, further comprising:
    an amplifier system communicatively coupled to the first proof mass and the second proof mass, and operable to output a pick off voltage $V_{SPO}$,
    wherein a Coriolis voltage $V_{CUL}$ that is applied to a first electrode of the third electrode pair is determinable from the pick off voltage $V_{SPO}$,
    wherein a Coriolis voltage $V_{CLL}$ that is applied to a second electrode of the third electrode pair is determinable from the pick off voltage $V_{SPO}$,
    wherein a Coriolis voltage $V_{CUR}$ that is applied to a first electrode of the fourth electrode pair is determinable from the pick off voltage $V_{SPO}$,
    wherein a Coriolis voltage $V_{CLR}$ that is applied to a second electrode of the fourth electrode pair is determinable from the pick off voltage $V_{SPO}$, and
    wherein the first Coriolis rebalancing force at the first electrode pair corresponds to $V_{CUL}$ and $V_{CLL}$, and wherein the second Coriolis rebalancing force at the second electrode pair corresponds to $V_{CUR}$ and $V_{CLR}$.

15. A method for determining linear acceleration and rotation of a Micro-Electro-Mechanical Systems (MEMS) gyroscope, comprising:
    sensing a change in a first capacitance between a first electrode of a first electrode pair and a first proof mass;
    sensing a change in a second capacitance between a second electrode of the first electrode pair and the first proof mass;
    sensing a change in a third capacitance between a first electrode of a second electrode pair and a second proof mass;
    sensing a change in a fourth capacitance between a second electrode of the second electrode pair and the second proof mass;
    sensing a change in a fifth capacitance between a first electrode of a third electrode pair and the first proof mass;
    sensing a change in a sixth capacitance between a second electrode of the third electrode pair and the first proof mass;
    sensing a change in a seventh capacitance between a first electrode of a fourth electrode pair and the second proof mass; and sensing a change in an eighth capacitance between a second electrode of the fourth electrode pair and the second proof mass.

16. The method of claim 15, further comprising:
determining a linear acceleration from the sensed first capacitance, the sensed second capacitance, the sensed third capacitance, and the sensed fourth capacitance.

17. The method of claim 16, further comprising:
determining a linear acceleration rebalancing force from the determined linear acceleration;
applying the linear acceleration rebalancing force via the first electrode pair to the first proof mass; and
applying the linear acceleration rebalancing force via the second electrode pair to the second proof mass.

18. The method of claim 15, further comprising:
determining a rotation from the sensed fifth capacitance, the sensed sixth capacitance, the sensed seventh capacitance, and the sensed eighth capacitance.

19. The method of claim 18, further comprising:
determining a Coriolis rebalancing force from the determined rotation;
applying the Coriolis rebalancing force via the third electrode pair to the first proof mass; and
applying the Coriolis rebalancing force via the fourth electrode pair to the second proof mass.

* * * * *